United States Patent
Martysevich et al.

(10) Patent No.: US 11,506,584 B2
(45) Date of Patent: Nov. 22, 2022

(54) REAL TIME ON LOCATION CRUSH AND CONDUCTIVITY TESTING

(71) Applicant: Halliburton Energy Services, Inc., Houston, TX (US)

(72) Inventors: Vladimir Nikolayevich Martysevich, Spring, TX (US); Harold Grayson Walters, Tomball, TX (US)

(73) Assignee: Halliburton Energy Services, Inc., Houston, TX (US)

(*) Notice: Subject to any disclaimer, the term of this patent is extended or adjusted under 35 U.S.C. 154(b) by 1150 days.

(21) Appl. No.: 16/060,390

(22) PCT Filed: Jan. 29, 2016

(86) PCT No.: PCT/US2016/015690
§ 371 (c)(1),
(2) Date: Jun. 7, 2018

(87) PCT Pub. No.: WO2017/131754
PCT Pub. Date: Aug. 3, 2017

(65) Prior Publication Data
US 2018/0356323 A1   Dec. 13, 2018

(51) Int. Cl.
*G01N 3/10* (2006.01)
*E21B 43/267* (2006.01)
(Continued)

(52) U.S. Cl.
CPC .............. *G01N 3/10* (2013.01); *E21B 43/267* (2013.01); *G01N 3/08* (2013.01); *G01N 29/04* (2013.01);
(Continued)

(58) Field of Classification Search
CPC ............ G01N 3/10; G01N 3/08; G01N 29/04; G01N 29/14; G01N 29/50;
(Continued)

(56) References Cited

U.S. PATENT DOCUMENTS 4,355,280 A   10/1982  Duzich
6,112,599 A *  9/2000  Maki, Jr. ................ G01N 29/30
                                                              73/587
(Continued)

FOREIGN PATENT DOCUMENTS

WO   WO-9716716 A1 *  5/1997 ............. G01N 15/00

OTHER PUBLICATIONS

International Search Report and Written Opinion for PCT/US2016/015690 dated Oct. 20, 2016.
(Continued)

*Primary Examiner* — Suman K Nath
(74) *Attorney, Agent, or Firm* — Thomas Rooney; C. Tumey Law Group PLLC (57) ABSTRACT

A method for real time crush testing of proppants including loading proppant into an apparatus comprising: a body with a chamber to accept a piston and proppant; a pressure piston; a pressure transducer located in the bottom of the chamber; and a displacement sensor; compressing the proppant with the pressure; calculating the amount of proppant material in the proppant pack; increasing pressure on the proppant pack until the sample is crushed; calculating proppant strength from at least the displacement sensor data. An apparatus includes a body with a chamber to accept a piston and proppant; a pressure piston; a pressure transducer located in the bottom of the chamber; and a displacement sensor.

24 Claims, 6 Drawing Sheets

(51) Int. Cl.
*G01N 29/04* (2006.01)
*G01N 29/14* (2006.01)
*G01N 3/08* (2006.01)
*G01N 29/50* (2006.01)

(52) U.S. Cl.
CPC ............. *G01N 29/14* (2013.01); *G01N 29/50* (2013.01); *G01N 2203/0019* (2013.01); *G01N 2203/0087* (2013.01); *G01N 2203/0284* (2013.01); *G01N 2291/023* (2013.01); *G01N 2291/02827* (2013.01)

(58) Field of Classification Search
CPC ... G01N 2203/0019; G01N 2203/0087; G01N 2203/0284; G01N 2291/023; G01N 2291/02827; E21B 43/267
See application file for complete search history.

(56) References Cited

U.S. PATENT DOCUMENTS

| | | | |
|---|---|---|---|
| 6,296,081 | B1 | 10/2001 | Nagai et al. |
| 7,562,583 | B2 | 7/2009 | Conway et al. |
| 2005/0217346 | A1 | 10/2005 | Nagarkatti et al. |
| 2014/0076569 | A1 | 3/2014 | Pham et al. |
| 2014/0208841 | A1 | 7/2014 | Fluidion |
| 2017/0073919 | A1* | 3/2017 | Barron ................... G01B 7/16 |

OTHER PUBLICATIONS

SPE 118929 "Modified API/ISO Crush Tests with a Liquid-Saturated Proppant Under Pressure Incorporating Temperature, Time and Cyclic Loading: What does It Tell US?" to Freeman et al. 2009.

* cited by examiner

REAL TIME ON LOCATION CRUSH AND CONDUCTIVITY TESTING

BACKGROUND

Hydrocarbon-producing wells are often stimulated by hydraulic fracturing treatments. In hydraulic fracturing treatments, a viscous fracturing fluid is pumped into a producing zone at a rate and pressure such that the subterranean formation breaks down and one or more fractures are formed in the zone. Particulate solids, such as graded sand, which are often referred to as "proppant" are suspended in a portion of the fracturing fluid and then deposited in the fractures when the fracturing fluid is converted to a thin fluid to be returned to the surface. These particulates serve, inter cilia, to prevent the fractures from fully closing so that conductive channels are formed through which produced hydrocarbons can flow.

Hydrocarbon-producing wells may also undergo gravel packing treatments to reduce the migration of unconsolidated formation particulates into the well bore. In gravel packing operations, particulates, often referred to in the art as gravel, are carried to a well bore in a subterranean producing zone by a servicing fluid that acts as a gravel carrier fluid. That is, the particulates are suspended in a carrier fluid, which may be and usually is viscosified, and the carrier fluid is pumped into a well bore in which the gravel pack is to be placed. As the particulates are placed in or near the zone, the carrier fluid leaks off into the subterranean zone and/or is returned to the surface. The resultant gravel pack acts as a sort of filter to prevent the production of the formation solids with the produced fluids. Traditional gravel pack operations involve placing a gravel pack screen in the well bore before packing the surrounding annulus between the screen and the well bore with gravel. The gravel pack screen is generally a filter assembly used to support and retain the gravel placed during the gravel pack operation. A wide range of sizes and screen configurations is available to suit the characteristics of a well bore, the production fluid, and any particulates in the subterranean formation. Gravel packs are used, among other reasons, to stabilize the formation while causing minimal impairment to well productivity.

In some situations, hydraulic fracturing and gravel packing operations may be combined into a single treatment. Such treatments are often referred to as "frac pack" operations. In some cases, the treatments are completed with a gravel pack screen assembly in place with the hydraulic fracturing treatment being pumped through the annular space between the casing and screen. In this situation, the hydraulic fracturing treatment ends in a screen-out condition, creating an annular gravel pack between the screen and casing. In other cases, the fracturing treatment may be performed prior to installing the screen and placing a gravel pack.

Currently, a variety of particulate materials are used in fracturing, gravel packing, and frac-packing operations. These include graded natural materials, such as sand or nut shells, or constructed materials, such as bauxite, ceramics, glasses, polymer particles, composite particles, and the like. Most common of these are high-quality graded natural sands, such as Ottawa or Brady sand.

The degree of success of a hydraulic fracturing operation depends, at least in part, upon proper selection of the proppants. The properties of proppants may vary greatly between different lots and under different conditions, and thus, there is a need for an apparatus and method for on location real time measurement of proppant crush and conductivity.

BRIEF DESCRIPTION OF THE DRAWINGS

The following figures are included to illustrate certain aspects of the present invention, and should not be viewed as exclusive embodiments. The subject matter disclosed is capable of considerable modification, alteration, and equivalents in form and function, as will occur to one having ordinary skill in the art and having the benefit of this disclosure.

DETAILED DESCRIPTION

The present invention generally relates to the testing of proppants used subterranean operations, and, more specifically, to the real time testing of proppants, and apparatuses used to test the proppants.

Embodiments of the invention are directed to an apparatus comprising an in-line proppant crush tester and an optional acoustic emission sensor.

In an embodiment, a method for real time crush testing of proppants comprises loading proppant into an apparatus comprising: a body with a chamber configured to accept a pressure piston and proppant; a pressure piston configured to slide in said chamber such that proppant may be at least one of: loaded into the chamber, crushed in the chamber, emptied from the chamber, and combinations thereof; a pressure transducer located in the bottom of the chamber; and a displacement sensor located in a position to measure the linear displacement of the pressure piston; compressing the proppant with the pressure piston to a pressure resulting in a proppant pack; calculating the amount of proppant material in the proppant pack; increasing pressure on the proppant pack until the sample is crushed; and calculating proppant strength from at least the displacement sensor data. The method may further comprise a channel in the body configured to load proppant from a proppant supply into the chamber. The method may additionally comprise: a slot in the body configured to accept a base platen, wherein the slot enters a portion of the chamber; and a base platen, configured to slide in the slot such that a portion of the base platen forms the bottom of the chamber when the apparatus is crushing proppant, wherein the base platen is configured to slide to a position where at least a portion of the chamber bottom is open after crushing proppant.

In some embodiments, the method may further comprise an acoustic emission sensor located in the portion of the base platen that forms the bottom of the chamber. The method may further comprise sliding the base platen such that the bottom of the chamber is partially open, thereby allowing disposal of the crushed proppant pack. In an embodiment, the method further comprises sliding the base platen back into a position where it forms the bottom of the chamber. In some embodiments, the displacement sensor is a linear variable differential transformer (LVDT). The calculating of the amount of proppant may be accomplished by using the LVDT measurements to determine the distance of the bottom of the pressure piston from the base platen and multiplying by the cross sectional area of the portion of the chamber with the proppant sample. The method may further comprise a control system for receiving data and analyzing data from at least one of the acoustic emission sensor, the pressure transducer, the linear variable differential transformer, and combinations thereof. In another embodiment, the method may further comprise a display and displaying at least one of the data, the results of the analyzed data, and combinations thereof. In an embodiment, the pressure piston is adapted to slide to a position above the channel to allow the proppant to be loaded into the chamber. The loading of the proppant into the chamber may comprise lifting the pressure piston to a top position above the channel for a period of time until the desired amount of proppant has been loaded into the chamber. The calculating of the amount of proppant material in the proppant pack may be determined by signals from the LVDT. The step of increasing pressure on the proppant pack until the sample is crushed may include receiving LVDT data at various pressure values for calculating API proppant strength. In some embodiments, the pressures are at least one of about 4000 psi, about 5000 psi, about 6000 psi, and combinations thereof. In an embodiment, the acoustic emission data may be collected in combination with pressure data and LVDT measurements. In another embodiment, wherein acoustic emission data, pressure data, and LVDT measurements may be used to calculate proppant pack strength. The method may further comprise combining base line conductivity data for the proppant with the acoustic emission data, pressure data, and LVDT measurements. The method may further comprise generating a conductivity curve for the proppant in real time by correlating the acoustic emission signature with the pressure data and with the baseline conductivity data. In an embodiment, the method may further comprise displaying the conductivity curve in real time on a display. The proppant may be a representative sample of a proppant used in a wellbore treatment operation. The method may further comprise determining if the proppant may be used in a fluid for a wellbore treatment operation. In an embodiment, the method further comprises combining the proppant with the wellbore fluid if the resulting wellbore fluid may be used for the wellbore treatment operation. In yet another embodiment, the method further comprises using the resulting wellbore fluid in a wellbore treatment operation.

In one embodiment, an apparatus for crush testing proppants includes a body with a chamber configured to accept a pressure piston and proppant; a pressure piston configured to slide in said chamber such that proppant may be at least one of: loaded into the chamber, crushed in the chamber, emptied from the chamber, and combinations thereof; a pressure transducer located in the bottom of the chamber; and a displacement sensor located in a position to measure the linear displacement of the pressure piston. The apparatus may further comprise a channel in the body configured to load proppant from a proppant supply in to the chamber. The apparatus may further comprise an acoustic emission sensor located in the portion of the base platen that forms the bottom of the chamber. The apparatus may further comprise: a slot in the body configured to accept a base platen, wherein the slot enters a portion of the chamber; and a base platen, configured to slide in the slot such that a portion of the base platen forms the bottom of the chamber when the apparatus is crushing proppant, wherein the base platen is configured to slide to a position where at least a portion of the chamber bottom is open after crushing proppant. In some embodiments, the displacement sensor is a linear variable differential transformer (LVDT). Additionally, the apparatus may further comprise a control system for receiving data and analyzing data from at least one of the acoustic emission sensor, the pressure transducer, the linear variable differential transformer, and combinations thereof. The apparatus may further comprise a display for displaying the data and the results of the analyzed data. In some embodiments, the pressure piston may be adapted to slide to a position above the channel to allow the proppant to be loaded into the chamber. The channel may be configured to allow the proppant to load into the chamber using gravity flow.

In an embodiment, a system for real time crush testing of proppants is disclosed, the system comprising: an apparatus configured to: load proppant for crush testing, the apparatus comprising: a body with a chamber configured to accept a pressure piston and proppant; a pressure piston configured to slide in said chamber such that proppant may be at least one of: loaded into the chamber, crushed in the chamber, emptied from the chamber, and combinations thereof; an acoustic emission sensor located in the bottom of the chamber; a pressure transducer located in the bottom of the chamber; and a displacement sensor located in a position to measure the linear displacement of the pressure piston; a control system for receiving data and analyzing data from at least one of the acoustic emission sensor, the pressure transducer, the displacement sensor, and combinations thereof; and a display for displaying the data and the results of the analyzed data; compress the proppant with the pressure piston to a pressure resulting in a proppant pack; calculate the amount of proppant material in the proppant pack; increase pressure on the proppant pack until the sample is crushed; and calculate proppant strength from at least the displacement sensor data and pressure data. The system may further comprise a channel in the body configured to load proppant from a proppant supply into the chamber. The system may further comprise: a slot in the body configured to accept a base platen, wherein the slot enters a portion of the chamber; and a base platen, configured to slide in the slot such that a portion of the base platen forms the bottom of the chamber when the apparatus is crushing proppant, wherein the base platen is configured to slide to a position where at least a portion of the chamber bottom is open after crushing proppant.

The crush testing procedures of the disclosure have at least three different variations in the equipment and/or procedures used. First, force as calculated by the pressure sensor, and displacement as calculated by the displacement sensor may be used. A second method involves force as calculated by the pressure sensor and data from the acoustic emission sensor. A third method utilized force as calculated by the pressure sensor, displacement as calculated by the displacement sensor, and data from the acoustic emission sensor.

Apparatus

FIGS. 1 through 4 represent one possible embodiment of the apparatus showing its main components and working cycle, and are not limiting the disclosure thereto. Components of the apparatus 10 include body 12 with a chamber 14 configured to accept a pressure piston 16, a channel 24 in body 12 configured to load proppant from a proppant supply 28 into the chamber 14, a base platen 18 that slides in a substantially horizontal direction such that a portion of the base platen 30 forms the bottom of the chamber 14. The apparatus also comprises a pressure transducer with optional acoustic emission sensor 20, and a displacement sensor 22. In some embodiments, the displacement sensor is a linear variable differential transformer (LVDT). The apparatus is connected to proppant supply system 28 and has an ability to receive samples in the process of the fracturing treatment.

Figure 1:
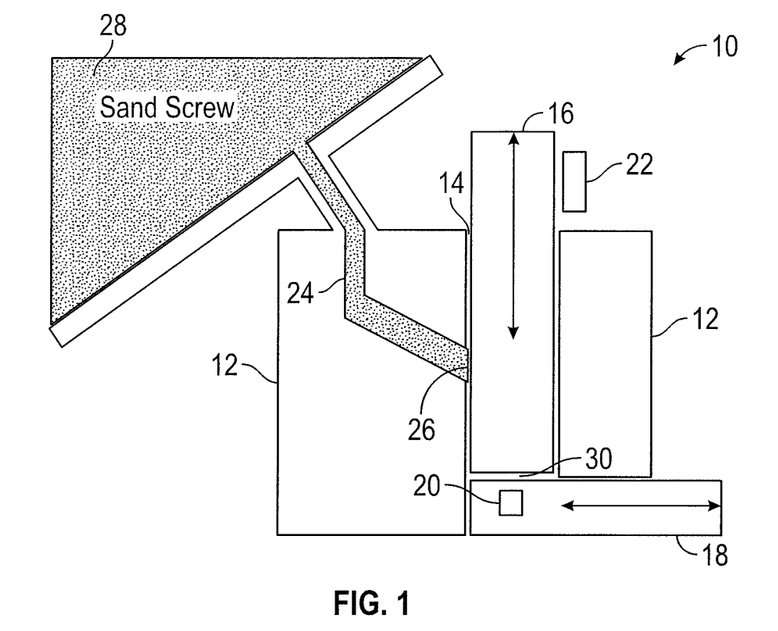
FIGS. 1-4 depict an apparatus for real time crush testing according to embodiments of the invention.
Figure 2:
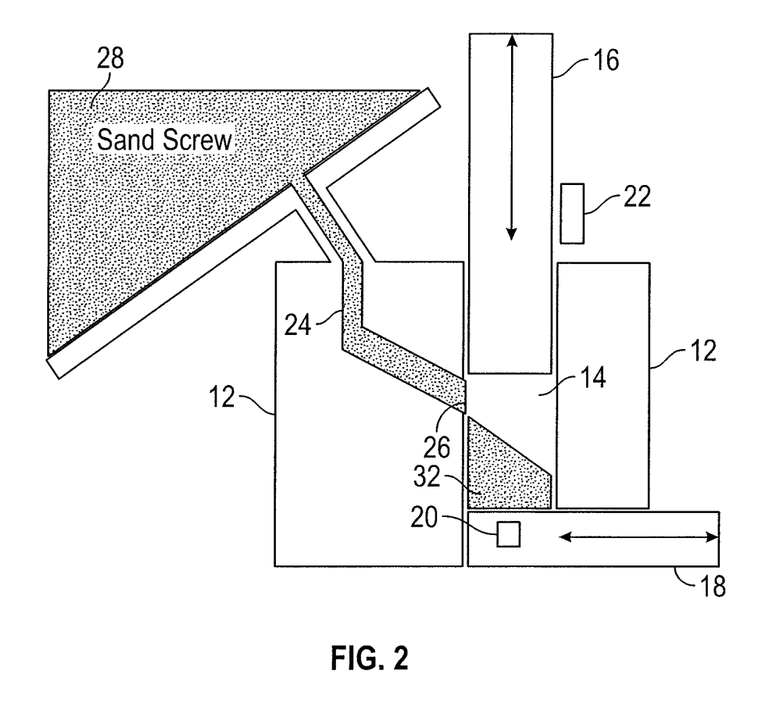
Figure 3:
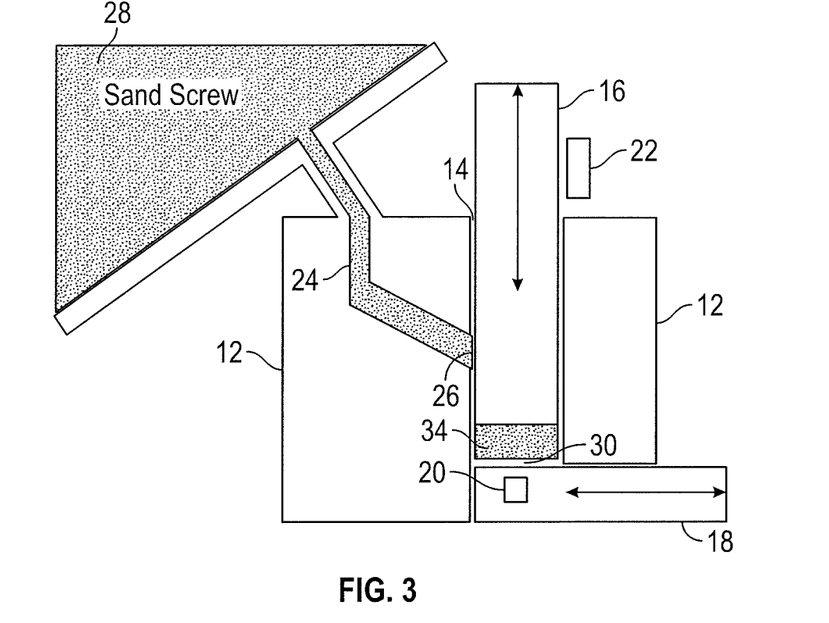
Figure 4:
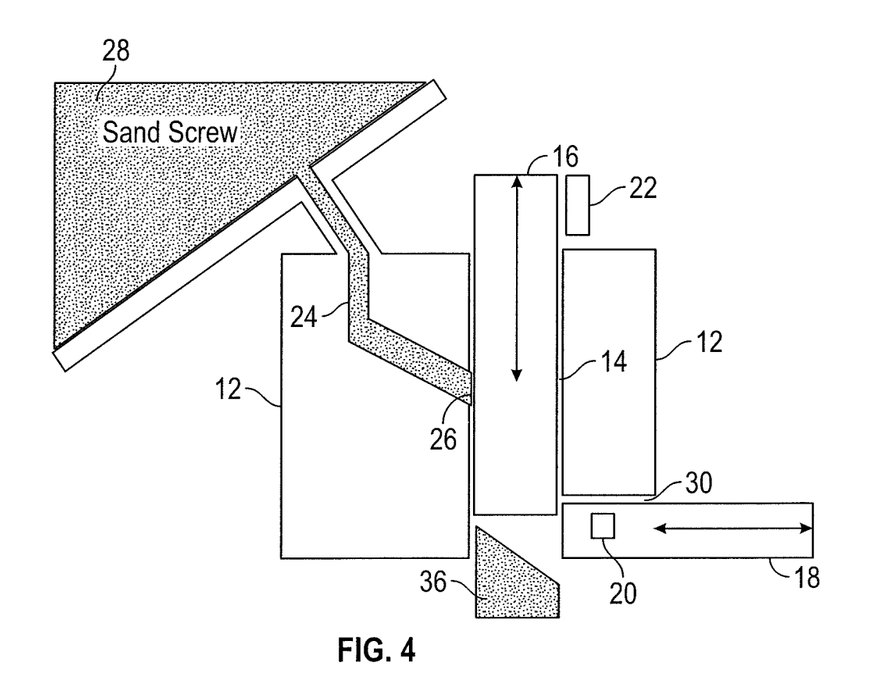

At the first stage of working cycle the pressure piston 16 is blocking the sample loading channel 26. The output for LVDT 22 is zeroed. Then the base platen 18 is closed and the apparatus is ready for testing as seen in FIG. 1. At the second stage, the pressure piston 16 goes up and opens path 26 for proppant to enter into the apparatus. The amount of received proppant 32 may be controlled by the length time the pressure piston 16 is in top position, as illustrated in FIG. 2. As demonstrated in FIG. 3, the pressure piston 16 moves down and meets the proppant pack and compresses it 34 onto the surface of base platen 30 to a pressure that ensures material packing close to "dense packing." At this stage signal from the LVDT 22 provides an exact measurement on the proppant 34 amount to be tested. Pressure piston 16 continues to increase pressure on the sample till the sample is crushed. Data from LVDT 22 at 4000, 5000, 6000 psi provides API standard values for proppant strength. Acoustic emission data in combination with pressure and LVDT measurements may provide exact values for proppant pack strength. As illustrated in FIG. 4, after the crush test is complete, the sample crush base platen 18 slides and opens the apparatus for sample disposal 36 and chamber 14 clean up. The disposal phase may include a pneumatic cleanout or any other type of assisted cleanout. Sliding the base platen back returns the apparatus back to first stage of the cycle as illustrated in FIG. 1.

The body may be any shape as long as it can accommodate a crushing chamber, a slot to receive the base platen, and an optional channel for loading proppant. The shape of the chamber may be any shape that will accommodate the pressure piston. In an embodiment, the chamber is cylindrical in shape. The piston may be any shape as long as it may be accommodated by the chamber in the body. In an embodiment, the piston is a cylinder. In another embodiment, the piston is rectangular. In some embodiments, the piston travels in a substantially vertical direction.

The slot may be any shape, as long as it accommodates the base platen. In an embodiment, the slot extends through only one wall of the chamber. In another embodiment, the slot extends through the chamber and into the wall of the body on the opposite side of the chamber from the initially penetrated wall. The base platen may be any shape as long as it can slidably enter the slot and chamber of the body. In some embodiments, the base platen slides in a substantially horizontal direction.

One of skill in the art will realize that external devices may be utilized to operate the apparatus. For example, a sand screw may aid in loading proppant from a storage bin to the sample loading channel. In an embodiment, a hydraulic device may provide lifting or pushing force to the pressure piston. Also, a hydraulic device may be used to slide the base platen from open to closed positions.

In some embodiments, the loading of the chamber may be accomplished by lifting the pressure piston out of the chamber and loading the proppant through the top.

Crush Testing Process

Figure 5A:
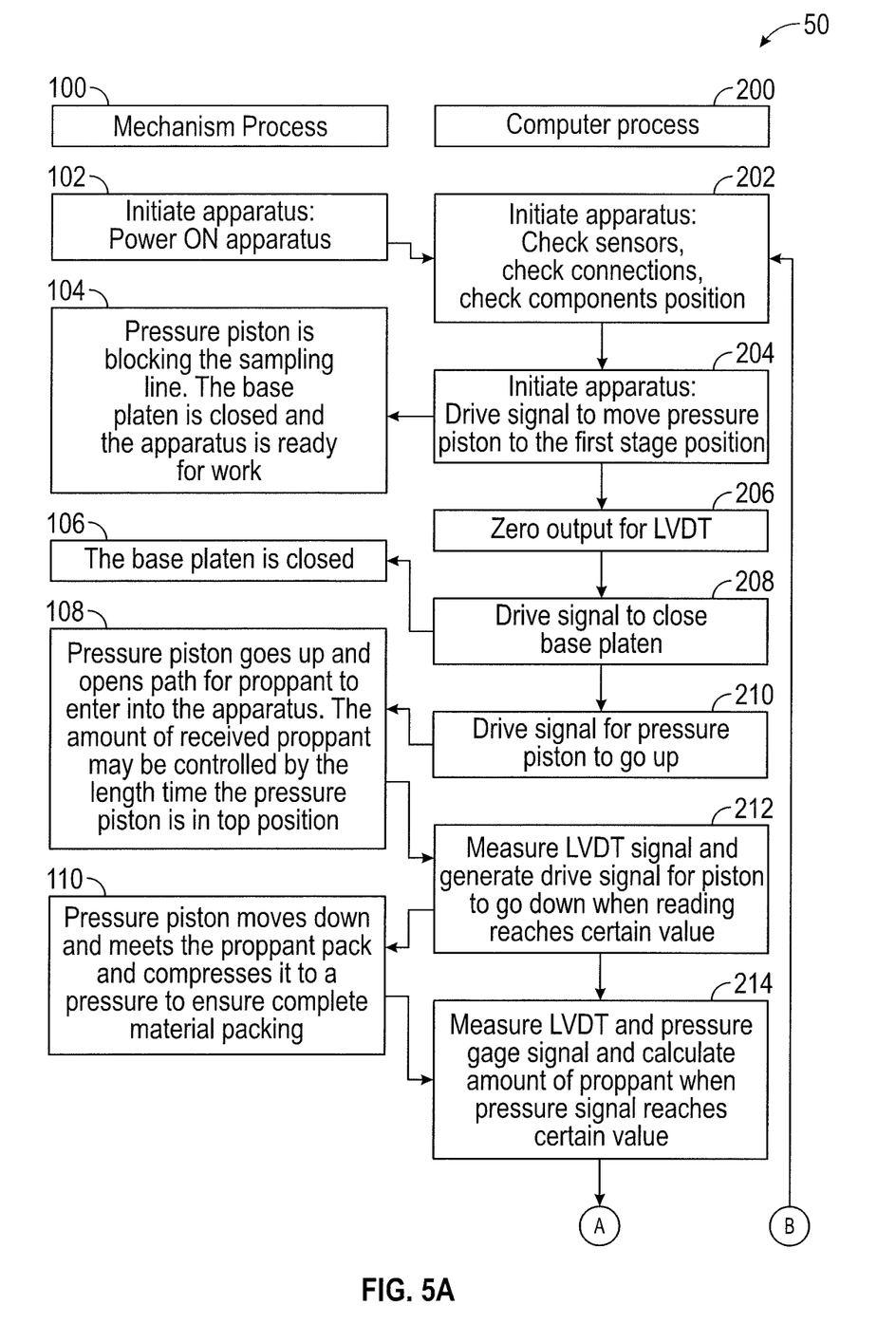
FIGS. 5A,B are flow charts of a method using the apparatus for real time crush testing according to embodiments of the invention.
Figure 5B:
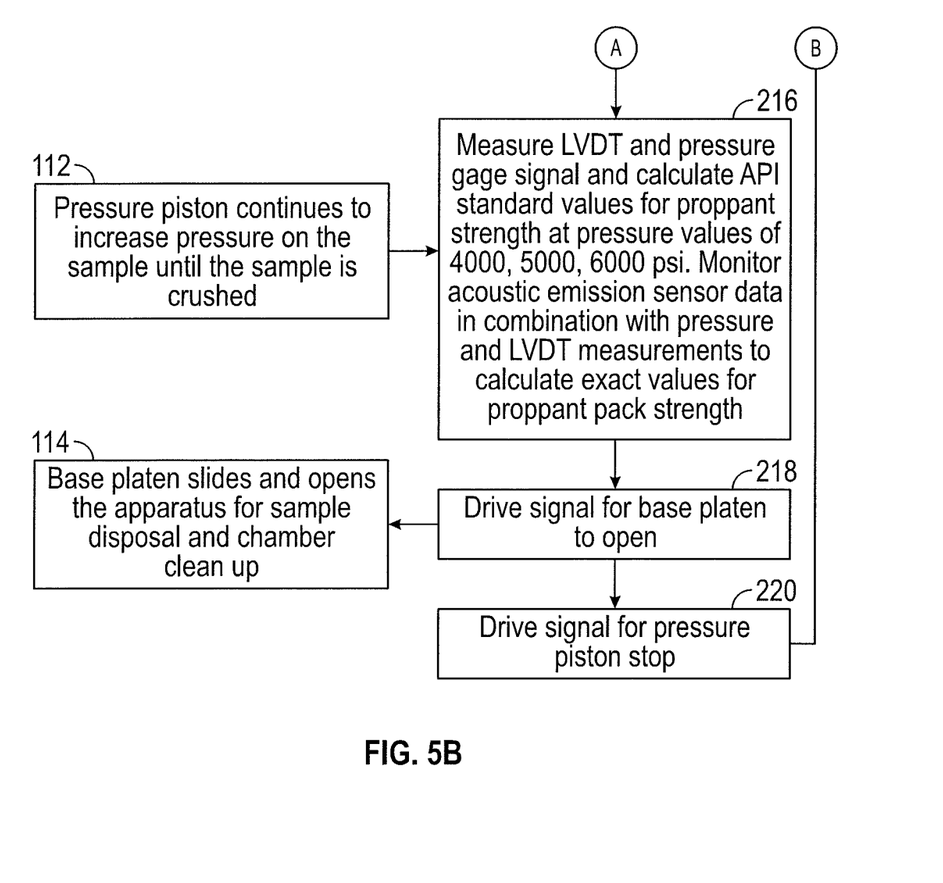

FIG. 5 illustrates a flow diagram of one embodiment of the process flow of the apparatus as well as the corresponding control system. The overall process 50 in this example contains two processes: One column represents the process of the mechanism 100 and the other column represents the computer process 200. First, the apparatus is initiated by powering on the apparatus 102. The computer may also be initiated by checking sensors, checking connections, and checking the component positions 202. Next, the computer initiates the apparatus by sending a drive signal to move the pressure position to the first stage position 204. The computer also zeroes the LVDT 206 and send a drive signal to close the base platen 208. The mechanism should be in a position where the pressure piston is blocking the sample loading channel 104. Also, the base platen should be moved into a closed position 106. Next, the computer sends a drive signal for the pressure piston to go up 201. The pressure pistons goes up and opens a path for the proppant to inter into the apparatus 108. The amount of received proppant may be controlled by the length of time the pressure piston is in the top position. Next, the computer measures the LVDT signal and generates a drive signal for the pressure piston to go down when the reading reaches a certain value 212. The pressure piston moves down and meets the proppant pack and compresses it to a pressure to ensure complete material packing 110. Next, the computer measures LVDT and pressure gage signals and calculates the amount of proppant is present when the pressure signal reaches a certain valve 214. The pressure pistons continues to increase pressure on the sample until the sample is crushed 112. The computer then measures LVDT and pressure gage signal and calculates API standard valves for proppant strength at pressure values of about 4000, about 5000, and about 6000 psi 216. The computer also collects acoustic emission sensor data in combination with the pressure and LVDT measurements to calculate exact valves for proppant pack strength. After the data has been collected, the computer sends a drive signal for the base platen to open 218 and for the pressure piston to stop 220. The base platen slides and opens the apparatus for sample disposal and chamber clean up 114.

Analysis Methods

In the disclosure there are at least two analysis methods. A first analysis method is for crush testing. The purpose of this method is to continuously perform on the fly proppant sampling and crush testing during a fracturing treatment. One of the results from the testing is the proppant strength number. The testing may be performed as per API step loading (4000, 5000, 6000 psi) or using an acoustic emission sensor to detect the actual failure point.

A second analysis method is for fracture conductivity calculation. The data from the first method is combined with baseline conductivity data for that particular proppant. The entire acoustic emission signature is correlated with the loading and to the baseline conductivity data to generate a conductivity curve for the proppant in real time. This data and/or the coefficients to generate the curve may be recorded along with the job data.

Real Time Display

Figure 6:
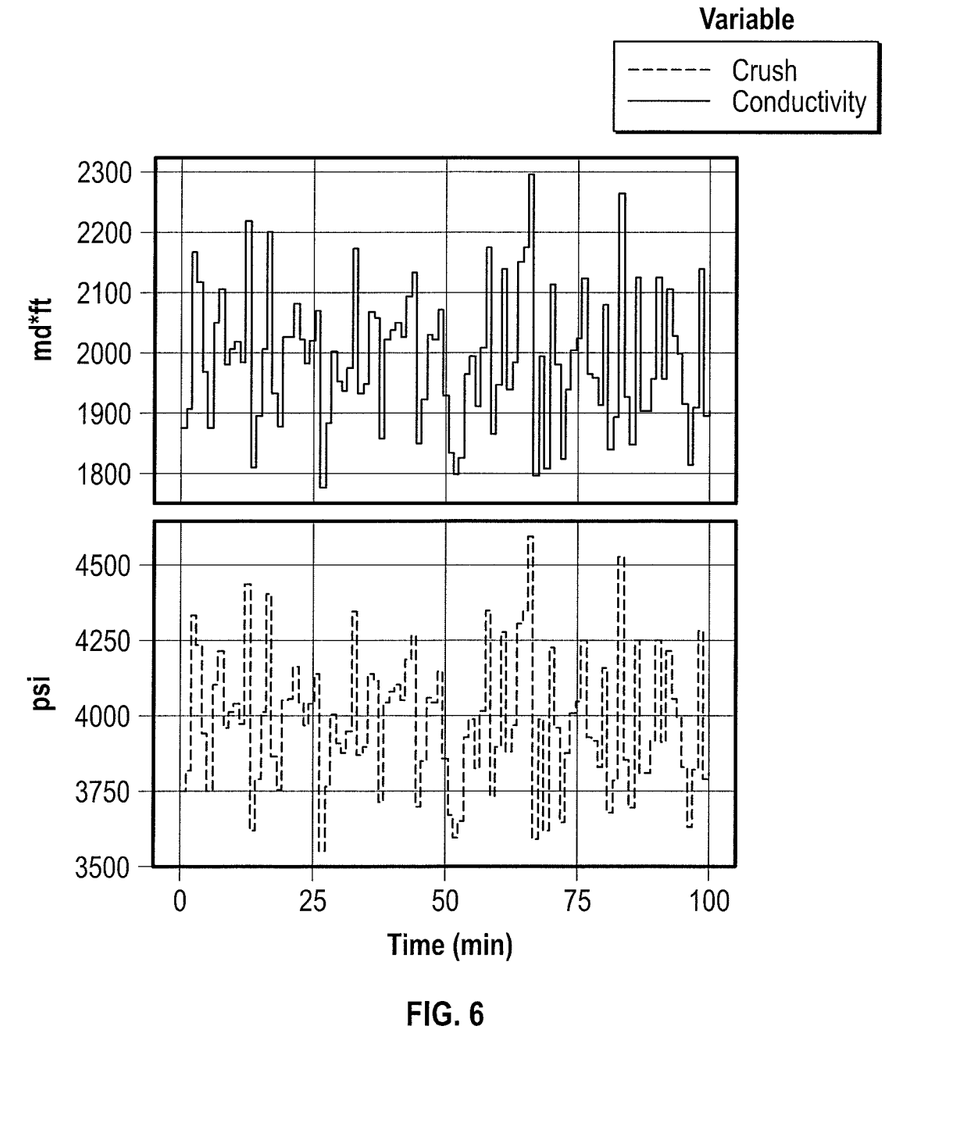
FIG. 6 is a cart displaying real time crush test results and conductivity values according to embodiments of the invention.

Both the crush test results and a conductivity value for a given set of conditions may be displayed in real time on a display device. This device may be on or off location and the displayed data may be recorded with the job data. An example chart for display of crush (psi) and conductivity (md*ft) vs time is given in FIG. 6.

Engineering Analysis Software

The conductivity curve may be associated with the proppant in the same way as the other proppant properties may be. One useful method is to give a real time display of conductivity vs time along with crush strength. The engineering analysis software, such as a planar or complex fracture model, may then utilize that measured data to give a significantly more accurate solution.

Figure 7:
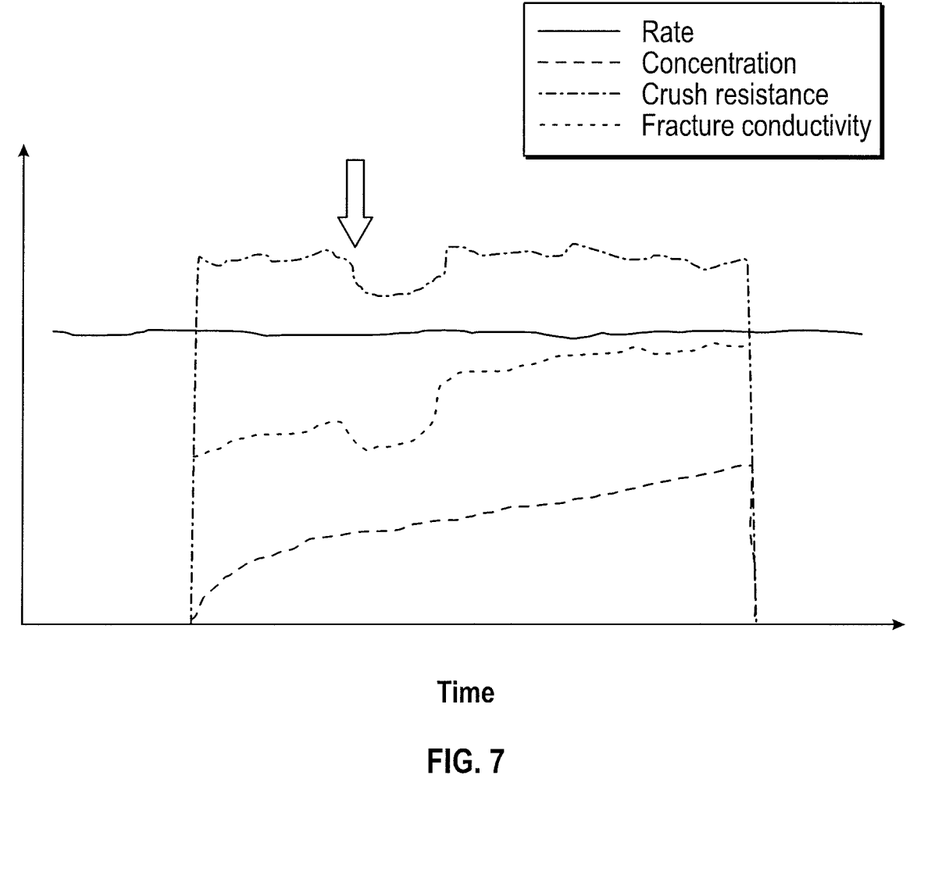
FIG. 7 is a chart displaying fracture conductivity as a function of crush resistance and proppant concentration.

While there have not been previous attempts to solve the real time problem and generate conductivity, the current manual process for crush testing is very time consuming. The present disclosure solves many of these shortcomings. FIG. 7 illustrates possible use scenario where fracture conductivity is represented as a function of crush resistance and proppant concentration. The arrow indicates changes in proppant quality allowing a field engineer to adjust a treatment schedule to improve fracture quality.

Proppants

Materials suitable for proppant particulates may comprise any material comprising inorganic or plant-based materials suitable for use in subterranean operations. Suitable materials include, but are not limited to, sand; bauxite; ceramic materials; glass materials; nut shell pieces; cured resinous particulates comprising nut shell pieces; seed shell pieces; cured resinous particulates comprising seed shell pieces; fruit pit pieces; cured resinous particulates comprising fruit pit pieces, wood; and any combination thereof. The mean proppant particulate size generally may range from about 2 mesh to about 400 mesh on the U.S. Sieve Series; however, in certain circumstances, other mean proppant particulate sizes may be desired and will be entirely suitable for practice of the embodiments disclosed herein. In particular embodiments, preferred mean proppant particulate size distribution ranges are one or more of 6/12, 8/16, 12/20, 16/30, 20/40, 30/50, 40/60, 40/70, or 50/70 mesh. It should be understood that the term "particulate," as used herein, includes all known shapes of materials, including substantially spherical materials; fibrous materials; polygonal materials (such as cubic materials); and any combination thereof.

Fluids

The proppants in the disclosure may be combined with base fluids to make wellbore treatment fluids. Suitable base fluids for use in conjunction with the present invention may include, but not be limited to, oil-based fluids; aqueous-based fluids; aqueous-miscible fluids; water-in-oil emulsions; or oil-in-water emulsions. Suitable oil-based fluids may include alkanes; olefins; aromatic organic compounds; cyclic alkanes; paraffins; diesel fluids; mineral oils; desulfurized hydrogenated kerosenes; and any combination thereof. Suitable aqueous-based fluids may include fresh water, saltwater (e.g., water containing one or more salts dissolved therein), brine (e.g., saturated salt water), seawater, and any combination thereof. Suitable aqueous-miscible fluids may include, but are not limited to, alcohols (e.g., methanol, ethanol, n-propanol, isopropanol, n-butanol, sec-butanol, isobutanol, and t-butanol; glycerins); glycols (e.g., polyglycols, propylene glycol, and ethylene glycol); polyglycol amines; polyols; any derivative thereof; any in combination with salts (e.g., sodium chloride, calcium chloride, calcium bromide, zinc bromide, potassium carbonate, sodium formate, potassium formate, cesium formate, sodium acetate, potassium acetate, calcium acetate, ammonium acetate, ammonium chloride, ammonium bromide, sodium nitrate, potassium nitrate, ammonium nitrate, ammonium sulfate, calcium nitrate, sodium carbonate, and potassium carbonate); any in combination with an aqueous-based fluid; and any combination thereof. Suitable water-in-oil emulsions, also known as invert emulsions, may have an oil-to-water ratio from a lower limit of greater than about 50:50, 55:45, 60:40, 65:35, 70:30, 75:25, or 80:20 to an upper limit of less than about 100:0, 95:5, 90:10, 85:15, 80:20, 75:25, 70:30, or 65:35 by volume in the base fluid, where the amount may range from any lower limit to any upper limit and encompass any subset therebetween. It should be noted that for water-in-oil and oil-in-water emulsions, any mixture of the above may be used including the water being and/or comprising an aqueous-miscible fluid. The base fluids for use in the present invention may additionally be gelled or foamed by any means known in the art.

The aqueous base fluids of the present embodiments can generally be from any source, provided that the fluids do not contain components that might adversely affect the stability and/or performance of the treatment fluids of the present invention.

In some embodiments, the treatment fluids comprising proppants include those used in at least one of fracking operations, gravel packing operations, and combinations thereof.

Other Additives

In addition to the foregoing materials, it can also be desirable, in some embodiments, for other components to be present in the treatment fluid. Such additional components can include, without limitation, particulate materials, fibrous materials, bridging agents, weighting agents, gravel, cross-linking agents, gelling agents, corrosion inhibitors, catalysts, clay control stabilizers, biocides, bactericides, friction reducers, gases, surfactants, solubilizers, salts, scale inhibitors, foaming agents, anti-foaming agents, iron control agents, and the like.

Embodiments disclosed herein include:

A: A method for real time crush testing of proppants, the method comprising: loading proppant into an apparatus comprising: a body with a chamber configured to accept a pressure piston and proppant; a pressure piston configured to slide in said chamber such that proppant may be at least one of: loaded into the chamber, crushed in the chamber, emptied from the chamber, and combinations thereof; a pressure transducer located in the bottom of the chamber; and a displacement sensor located in a position to measure the linear displacement of the pressure piston; compressing the proppant with the pressure piston to a pressure resulting in a proppant pack; calculating the amount of proppant material in the proppant pack; increasing pressure on the proppant pack until the sample is crushed; and calculating proppant strength from at least the displacement sensor data.

B: An apparatus for crush testing proppant, the apparatus comprising: a body with a chamber configured to accept a pressure piston and proppant; a pressure piston configured to slide in said chamber such that proppant may be at least one of: loaded into the chamber, crushed in the chamber, emptied from the chamber, and combinations thereof; a pressure transducer located in the bottom of the chamber; and a displacement sensor located in a position to measure the linear displacement of the pressure piston.

C: A system for real time crush testing of proppants, the system comprising: an apparatus configured to: load proppant for crush testing, the apparatus comprising: a body with a chamber configured to accept a pressure piston and proppant; a pressure piston configured to slide in said chamber such that proppant may be at least one of: loaded into the chamber, crushed in the chamber, emptied from the chamber, and combinations thereof; an acoustic emission sensor located in the bottom of the chamber; a pressure transducer located in the bottom of the chamber; and a displacement sensor located in a position to measure the linear displacement of the pressure piston; a control system for receiving data and analyzing data from at least one of the acoustic emission sensor, the pressure transducer, the displacement sensor, and combinations thereof; and a display for displaying the data and the results of the analyzed data; compress the proppant with the pressure piston to a pressure resulting in a proppant pack; calculate the amount of proppant material in the proppant pack; increase pressure on the proppant pack until the sample is crushed; and calculate proppant strength from at least the displacement sensor data and pressure data.

Each of embodiments A, B, and C may have one or more of the following additional elements in any combination: Element 1: further comprising a channel in the body configured to load proppant from a proppant supply into to the chamber. Element 2: further comprising an acoustic emission sensor located in the portion of the base platen that forms the bottom of the chamber. Element 3: further comprising sliding the base platen such that the bottom of the chamber is partially open, thereby allowing disposal of the crushed proppant pack. Element 4: further comprising sliding the base platen back into a position where it forms the bottom of the chamber. Element 5: wherein calculating the amount of proppant is accomplished by using the displacement sensor measurements to determine the distance of the bottom of the pressure piston from the base platen and multiplying by the cross sectional area of the portion of the chamber with the proppant sample. Element 6: further comprising a control system for receiving data and analyzing data from at least one of the acoustic emission sensor, the pressure transducer, the displacement sensor, and combinations thereof. Element 7: further comprising a display and displaying at least one of the data, the results of the analyzed data, and combinations thereof. Element 8: wherein the pressure piston is adapted to slide to a position above the channel to allow the proppant to be loaded into the chamber. Element 9: wherein the loading of the proppant into the chamber comprises lifting the pressure piston to a top position above the channel for a period of time until the desired amount of proppant has been loaded into the chamber. Element 10: wherein calculating the amount of proppant material in the proppant pack is determined by signals from the displacement sensor. Element 11: wherein increasing pressure on the proppant pack until the sample is crushed includes receiving displacement sensor data at various pressure values for calculating API proppant strength. Element 12: wherein the pressures are at least one of about 4000 psi, about 5000 psi, about 6000 psi, and combinations thereof. Element 13: wherein acoustic emission data is collected in combination with pressure data and displacement sensor measurements. Element 14: wherein acoustic emission data, pressure data, and displacement sensor measurements are used to calculate proppant pack strength. Element 15: further comprising combining base line conductivity data for the proppant with the acoustic emission data, pressure data, and displacement sensor measurements. Element 16: further comprising generating a conductivity curve for the proppant in real time by correlating the acoustic emission signature with the pressure data and with the baseline conductivity data. Element 17: further comprising displaying the conductivity curve in real time on a display. Element 18: wherein the real time crush testing occurs during at least one of a fracturing operation, a gravel packing operation, and combinations thereof. Element 19: wherein the displacement sensor is a linear variable differential transformer (LVDT). Element 20: wherein the channel is configured to allow the proppant to load into the chamber using gravity flow. Element 21, wherein the proppant is a representative sample of the proppant used in at least one of a fracturing operation, a gravel packing operation, and combinations thereof. Element 22, further comprising using the resulting wellbore fluid in a wellbore treatment operation. Element 23: further comprising a slot in the body configured to accept a base platen, wherein the slot enters a portion of the chamber; and a base platen, configured to slide in the slot such that a portion of the base platen forms the bottom of the chamber when the apparatus is crushing proppant, wherein the base platen is configured to slide to a position where at least a portion of the chamber bottom is open after crushing proppant. Element 24: further comprising an acoustic emission sensor located in the bottom of the chamber. Element 25: wherein the proppant is a representative sample of a proppant used in a wellbore treatment operation. Element 26: further comprising determining if the proppant may be used in a fluid for a wellbore treatment operation. Element 27: further comprising combining the proppant with the wellbore fluid if the resulting wellbore fluid may be used for the wellbore treatment operation.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Use of the term "optionally" with respect to any element of a claim is intended to mean that the subject element is required, or alternatively, is not required. Both alternatives are intended to be within the scope of the claim.

Numerous other modifications, equivalents, and alternatives, will become apparent to those skilled in the art once the above disclosure is fully appreciated. It is intended that the following claims be interpreted to embrace all such modifications, equivalents, and alternatives where applicable.

What is claimed is:

1. A method for real time crush testing of proppants, the method comprising:
   loading a proppant into an apparatus, wherein the proppant is a representative sample of a proppant used in a wellbore treatment operation comprising:
      a body with a chamber configured to accept a pressure piston and the proppant, wherein the chamber further comprises a bottom, and wherein the pressure piston is configured to slide in the chamber such that the proppant may be at least one of: loaded into the chamber, crushed in the chamber, emptied from the chamber, and/or combinations thereof;
      a pressure transducer located in the bottom of the chamber, wherein the pressure transducer measures pressure data; and
      a displacement sensor to measure displacement sensor data, wherein the displacement sensor is located in a position to measure a linear displacement of the pressure piston;
   compressing the proppant with the pressure piston to a first pressure resulting in a proppant pack;
   calculating the amount of proppant material in the proppant pack;
   increasing pressure on the proppant pack to a second pressure until the sample is crushed; and
   calculating proppant strength from at least the displacement sensor data and the pressure data.

2. The method of claim 1, further comprising a channel in the body configured to load proppant from a proppant supply into to the chamber wherein the loading of the proppant into the chamber comprises lifting the pressure piston to a top position above the channel for a period of time until the desired amount of proppant has been loaded into the chamber.

3. The method of claim 1, further comprising:
a slot in the body configured to accept a base platen, wherein the slot enters a portion of the chamber; and
a base platen, configured to slide in the slot such that a portion of the base platen forms the bottom of the chamber when the apparatus is crushing proppant, wherein the base platen is configured to slide to a position where at least a portion of the chamber bottom is open after crushing proppant.

4. The method of claim 1, further comprising an acoustic emission sensor located in the bottom of the chamber.

5. The method of claim 3, further comprising sliding the base platen such that the bottom of the chamber is partially open, thereby allowing disposal of the crushed proppant pack and sliding the base platen back into a position where it forms the bottom of the chamber.

6. The method of claim 1, wherein calculating the amount of proppant is accomplished by using the displacement sensor data to determine the distance of the bottom of the pressure piston from the bottom of the chamber and multiplying by the cross-sectional area of the portion of the chamber with the proppant sample.

7. The method of claim 4, further comprising a control system for receiving data and analyzing data from at least one of the acoustic emission sensor, the pressure transducer, the displacement sensor, and combinations thereof.

8. The method of claim 7, further comprising a display and displaying at least one of the data, the results of the analyzed data, and combinations thereof.

9. The method of claim 2, wherein the pressure piston is adapted to slide to a position above the channel to allow the proppant to be loaded into the chamber.

10. The method of claim 1, wherein calculating the amount of proppant material in the proppant pack is determined by signals from the displacement sensor.

11. The method of claim 1, wherein increasing pressure on the proppant pack until the sample is crushed includes receiving displacement sensor data at various pressure values for calculating API proppant strength wherein the pressures are at least one of about 4000 psi, about 5000 psi, about 6000 psi, and combinations thereof.

12. The method of claim 4, wherein acoustic emission data is collected in combination with pressure data and displacement sensor data.

13. The method of claim 4, wherein acoustic emission data, pressure data, and displacement sensor data are used to calculate a proppant pack strength.

14. The method of claim 13, further comprising combining base line conductivity data for the proppant with the acoustic emission data, pressure data, and displacement sensor data.

15. The method of claim 14, further comprising generating a conductivity curve for the proppant in real time by correlating an acoustic emission signature with the pressure data and with the baseline conductivity data.

16. The method of claim 15, further comprising displaying the conductivity curve in real time on a display.

17. The method of claim 1, wherein the real time crush testing occurs during at least one of a fracturing operation, a gravel packing operation, and combinations thereof.

18. The method of claim 1, wherein the displacement sensor is a linear variable differential transformer (LVDT).

19. The method of claim 1, further comprising:
combining the proppant with a wellbore fluid; and
using the resulting wellbore fluid in a wellbore treatment operation.

20. A system for real time crush testing of proppants, the system comprising:
an apparatus configured to:
load proppant for crush testing, the apparatus comprising:
a body with a chamber configured to accept a pressure piston and proppant, wherein the chamber further comprises a bottom, wherein the pressure piston is configured to slide in the chamber, wherein the chamber is disposed to receive the proppant from one or more sand screws, wherein the pressure piston is configured within the chamber to compress the proppant to a first pressure to create a proppant pack, wherein the pressure piston is configured within the chamber to compress the proppant to a second pressure to crush the proppant pack, and wherein the pressure piston is configured to slide in the chamber such that the proppant is emptied from the chamber;
an acoustic emission sensor located in the bottom of the chamber, wherein the sensor measures acoustic emission data;
a pressure transducer located in the bottom of the chamber, wherein the pressure transducer measures pressure data;
a displacement sensor to measure one or more displacement sensor data, wherein the displacement sensor is located in a position to measure the linear displacement of the pressure piston;
a control system to receive and analyze one or more pieces of data measured to create an analysis product from at least one of the acoustic emission sensor, the pressure transducer, the displacement sensor, and combinations thereof, wherein the analysis product is an amount of the proppant in the proppant pack or a proppant strength determined from at least the displacement sensors data and the pressure data; and
a display to display the one or more pieces of data or one or more analysis products.

21. A method for real time crush testing of proppants, the method comprising:
loading a proppant into an apparatus, comprising:
a body with a chamber configured to accept a pressure piston and a proppant, wherein the chamber further comprises a bottom, and wherein the pressure piston is configured to slide in the chamber such that the proppant may be at least one loaded into the chamber, crushed in the chamber, emptied from the chamber, and/or combinations thereof;
a pressure transducer located in the bottom of the chamber, wherein the pressure transducer measures pressure data;
an acoustic emission sensor located in the bottom of the chamber, wherein the sensor measures acoustic emission data; and
a displacement sensor to measure one or more displacement sensor data, wherein the displacement sensor is located in a position to measure a linear displacement of the pressure piston;
compressing the proppant with the pressure piston to a first pressure resulting in a proppant pack;
calculating the amount of proppant material in the proppant pack;
increasing pressure on the proppant pack to a second pressure until the sample is crushed;

combining base line conductivity data for the proppant with the acoustic emission data, pressure data, and displacement sensor data; and calculating proppant strength from the acoustic emission data, the pressure data, and the displacement sensor data.

22. The method of claim 21, further comprising generating a conductivity curve for the proppant in real time by correlating an acoustic emission signature with the pressure data and the baseline conductivity data.

23. The method of claim 22, further comprising displaying the conductivity curve in real time on a display.

24. A method for real time crush testing of proppants, the method comprising:

loading a proppant into an apparatus, comprising:
- a body with a chamber configured to accept a pressure piston and the proppant, wherein the chamber further comprises a bottom, and wherein the pressure piston is configured to slide in the chamber such that the proppant may be at least one of: loaded into the chamber, crushed in the chamber, emptied from the chamber, and/or combinations thereof;
- a pressure transducer located in the bottom of the chamber, wherein the pressure transducer measures pressure data; and
- a displacement sensor to measure displacement sensor data, wherein the displacement sensor is located in a position to measure a linear displacement of the pressure piston;

compressing the proppant with the pressure piston to a first pressure resulting in a proppant pack;

calculating the amount of proppant material in the proppant pack;

increasing pressure on the proppant pack to a second pressure until the sample is crushed;

calculating proppant strength from at least the displacement sensor data and the pressure data;

combining the proppant with a wellbore fluid; and using the wellbore fluid in a wellbore treatment operation, wherein the proppant is a representative sample of a proppant used in a wellbore treatment operation.

* * * * *